(12) United States Patent
Fodor et al.

(10) Patent No.: US 10,129,918 B2
(45) Date of Patent: Nov. 13, 2018

(54) METHODS, WIRELESS DEVICE, BASE STATION AND CANDIDATE RELAY STATION FOR SUPPORTING D2D COMMUNICATION OVER RELAY

(71) Applicant: Telefonaktiebolaget LM Ericsson (publ), Stockholm (SE)

(72) Inventors: Gabor Fodor, Hässelby (SE); Jose Mairton Barros da Silva Junior, Stockholm (SE); Tarcísio Maciel, Fortaleza-Ceará (BR); Aidilla Pradini, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 124 days.

(21) Appl. No.: 15/114,153

(22) PCT Filed: Feb. 4, 2014

(86) PCT No.: PCT/SE2014/050135
§ 371 (c)(1),
(2) Date: Jul. 26, 2016

(87) PCT Pub. No.: WO2015/119538
PCT Pub. Date: Aug. 13, 2015

(65) Prior Publication Data
US 2017/0251507 A1    Aug. 31, 2017

(51) Int. Cl.
*H04J 3/08*    (2006.01)
*H04W 76/14*    (2018.01)
(Continued)

(52) U.S. Cl.
CPC .......... *H04W 76/14* (2018.02); *H04W 24/10* (2013.01); *H04W 40/22* (2013.01); *H04W 40/02* (2013.01); *H04W 88/04* (2013.01)

(58) Field of Classification Search
CPC ..... H04B 7/2606; H04B 7/155; H04W 88/04; H04W 16/26; H04W 84/047
See application file for complete search history.

(56) References Cited

U.S. PATENT DOCUMENTS

2010/0157826 A1* 6/2010 Yu .......................... H04B 7/155
370/252
2012/0250563 A1* 10/2012 Liu ....................... H04W 40/12
370/252
(Continued)

FOREIGN PATENT DOCUMENTS

WO    2010006650 A1    1/2010

OTHER PUBLICATIONS

Doppler, Klaus et al., "Mode selection for Device-to-Device Communication underlaying an LTE-Advanced Network", 2010 IEEE Wireless Communication and Networking Conference (WCNC) Sydney, Australia, Apr. 18-21, 2010, 1-6.
(Continued)

*Primary Examiner* — Siren Wei
(74) *Attorney, Agent, or Firm* — Sage Patent Group

(57) ABSTRACT

A methods, base station, wireless device and candidate relay device for supporting a D2D communication between a first wireless device and a second wireless device over a relay. The base station receives (302) from the first device an identity of a candidate relay wireless device and a first quality metric ($G_eq$) pertaining to a first relay link between the first device and the candidate relay device and to a second relay link between the second device and the candidate relay device. The base station also obtains (304) a second quality metric (G12) pertaining to a D2D link between the first and second devices, and a third quality metric (G1 BS) pertaining to a cellular link between the base station and the first device. When the first quality metric ($G_eq$) indicates a better link quality than both the second
(Continued)

metric (G12) and the third metric (G1 BS), the base station selects (310) a relay mode for the D2D communication with the candidate relay device as the relay and instructs the involved devices accordingly.

4 Claims, 5 Drawing Sheets

(51) Int. Cl.
  *H04W 24/10* (2009.01)
  *H04W 40/22* (2009.01)
  *H04W 40/02* (2009.01)
  *H04W 88/04* (2009.01)

(56) References Cited

U.S. PATENT DOCUMENTS

2012/0287807 A1* 11/2012 Yamasaki ............ H04W 40/12
   370/252

2014/0328310 A1* 11/2014 Xu ........................ H04W 4/80
   370/329

OTHER PUBLICATIONS

Fodor, Gábor et al., "Design Aspects of Network Assisted Device-to-Device Communications", IEEE Communications Magazine, vol. 50, Issue 3, Mar. 2012, 170-177.
Gaohui, Tian et al., "Device-to-Device Communication with Network Coding and Relay", IEEE Broadband Wireless Access Working Group, vol. 802.16, Nov. 17, 2013, 1-7.
Ma, Xiran et al., "A Distributed Relay Selection Method for Relay Assisted Device-to-Device Communication System", 2012 IEEE 23rd International Symposium on Personal, Indoor and Mobile Radio Communications (PIMRC), Sep. 9-12, 2012, 1020-1024.
Unknown, Author, "Consideration of Interference Mitigation for D2D Communication", 3GPP TSG-RAN1 Meeting #74, R1-132993, Barcelona, Spain, Alcatei-Lucent Shanghai Bell, Aug. 19-23, 2013, 1-4.

* cited by examiner

METHODS, WIRELESS DEVICE, BASE STATION AND CANDIDATE RELAY STATION FOR SUPPORTING D2D COMMUNICATION OVER RELAY

TECHNICAL FIELD

The present disclosure relates generally to methods, wireless devices and a base station of a radio network, for supporting D2D communication between a first wireless device and a second wireless device over a relay wireless device.

BACKGROUND

When two wireless devices communicate with each other in a radio network in a traditional manner, each wireless device communicates radio signals with a serving base station of the radio network by sending uplink radio signals to the base station as well as receiving downlink radio signals from the base station. This is the traditional way of communication in a radio network also when the two wireless devices are located somewhat close to one another and being served by the same base station. This transmission mode will be referred to as a cellular mode of communication. Recently, techniques have been developed to enable such wireless devices in a radio network to communicate radio signals with each other directly, as controlled by the radio network and using frequency spectrum licensed to the network, such that each wireless device receives and decodes the actual radio signals that are transmitted from the opposite, or "peer", wireless device. Bluetooth is another example of direct communication between wireless devices, although without control or involvement by any network and using unlicensed frequency spectrum.

Communication of radio signals may thus take place directly between the two wireless devices without the radio signals being communicated over the radio network via one or more base stations, which is a transmission mode that will be referred to as a direct mode of communication. In that case, the serving base station allocates radio resources, e.g. defined by time and/or frequency, which the wireless devices are allowed to use in the direct communication. Such direct radio communication between two wireless devices is commonly referred to as "Device-to-Device, D2D, communication" or terminal-to-terminal communication.

In the field of cellular radio technology, the term "wireless device" is usually used and will be used in this disclosure to represent any wireless communication entity capable of radio communication with a cellular radio network including receiving and sending radio signals. Another common term in this field is "User Equipment, UE" which is often used for various wireless devices such as e.g. mobile telephones, tablets and laptop computers. However, a wireless device in this context is not necessarily operated by a human user. It could also be a machine-to-machine type of device operating automatically such as a sensor, counter or measuring entity.

Further, the term "base station", sometimes also referred to as a network node, radio node, e-NodeB, eNB, NB, base transceiver station, access point, etc., represents any node of a cellular radio network that is arranged to communicate radio signals with wireless devices. The base station described here may, without limitation, be a so-called macro base station or a low power base station such as a micro, pico, femto, Wifi or relay node, to mention some customary examples. Throughout this disclosure, the terms "network node" and "User Equipment, UE" can further be used instead of base station and wireless device, respectively.

The above D2D communication may thus be employed whenever the two wireless devices, also referred to as "peer devices" or just "peers", are close enough to one another to be able to receive and decode direct radio signals from the opposite peer. Thereby, it may be possible to reduce transmit power in the area and also to reduce interference, as compared to what is required to enable a serving base station to communicate radio signals with the wireless devices in the traditional manner.

In a conventional cellular communication between a base station and a wireless device, a radio signal transmitted by the wireless device may be successfully received and decoded by the base station provided that the current radio conditions allow for sufficient quality of the received signals. This means that the received signal should not be too weak and/or interfered too much by other radio transmissions in the neighborhood for satisfactory reception and decoding. For example, the wireless device may be situated close to the cell edge and relatively far from the base station, or in a spot with bad radio coverage, so that the radio signal fades considerably on its way to the base station. Furthermore, the wireless device may in that case need to transmit with increased power in order to provide a sufficiently strong signal at the receiving base station, which may cause interference to other nearby communications. Another possibility is to add redundant bits which can be used to assist the decoding in the base station's receiver although they occupy precious radio resources such that overall data throughput is reduced.

In a similar manner, when the direct mode is employed between two wireless devices, a radio signal transmitted by one wireless device may be successfully received and decoded by the other wireless device provided that the current radio conditions allow for sufficient quality of the received signals. The requirements for successful reception and decoding are thus similar to the case of cellular mode discussed above. It is also known to use a third wireless device as a D2D relay between the two communicating wireless devices where the third wireless device is in a fixed position and utilized as a part of the network infrastructure. However, a problem with such relays is that deployment is costly and the fixed position of the relay may make it unsuitable for communication, e.g. when one or both of the two communicating wireless is/are positioned too far away from the relay for favorable signal reception.

It is thus a problem to achieve sufficient signal quality over a D2D radio link between two wireless devices or over respective cellular radio links between the wireless devices and a base station, without causing too much interference and/or reduction of data throughput, particularly under less than optimal radio conditions.

SUMMARY

It is an object of embodiments described herein to address at least some of the problems and issues outlined above. It is possible to achieve this object and others by using methods, wireless devices and a base station as defined in the attached independent claims.

According to one aspect, a method is performed by a base station of a radio network, for supporting a D2D communication between a first wireless device and a second wireless device over a relay. In this method, the base station receives from the first wireless device an identity of a candidate relay wireless device and a first quality metric pertaining to a first relay link between the first wireless device and the candidate relay wireless device and to a second relay link between the second wireless device and the candidate relay wireless device.

The base station further obtains a second quality metric pertaining to a D2D link between the first wireless device and the second wireless device, and obtains also a third quality metric pertaining to a cellular link between the base station and the first wireless device. When the first quality metric indicates a better link quality than both the second quality metric and the third quality metric, the base station selects a relay mode for the D2D communication with the candidate relay wireless device acting as the relay. The base station then instructs the first wireless device, the second wireless device and the candidate relay wireless device to communicate according to the relay mode.

According to another aspect, a base station is operable in a radio network and arranged to support a D2D communication between a first wireless device and a second wireless device over a relay. The base station is configured to receive from the first wireless device an identity of a candidate relay wireless device and a first quality metric pertaining to a first relay link between the first wireless device and the candidate relay wireless device and to a second relay link between the second wireless device and the candidate relay wireless device.

The base station is also configured to obtain a second quality metric pertaining to a D2D link between the first wireless device and the second wireless device, and to obtain a third quality metric pertaining to a cellular link between the base station and the first wireless device. When the first quality metric indicates a better link quality than both the second quality metric and the third quality metric, the base station is further configured to select a relay mode for the D2D communication with the candidate relay wireless device acting as the relay, and to instruct the first wireless device, the second wireless device and the candidate relay wireless device to communicate according to the relay mode.

According to yet another aspect, a method is performed by a first wireless device for supporting a D2D communication between the first wireless device and a second wireless device over a relay, the first and second wireless devices being served by a base station of a radio network. In this method, the first wireless device transmits a beacon which is measurable by a candidate relay wireless device.

The first wireless device further receives from the candidate relay wireless device an identity of the candidate relay wireless device and a first quality metric pertaining to a first relay link between the first wireless device and the candidate relay wireless device and to a second relay link between the second wireless device and the candidate relay wireless device. The first wireless device then sends the identity and the first quality metric of the candidate relay wireless device to the base station, thereby enabling the base station to select a relay mode for the D2D communication with the candidate relay wireless device acting as the relay, based on the first quality metric.

According to yet another aspect, a first wireless device is arranged to support D2D communication between the first wireless device and a second wireless device over a relay. The first wireless device is configured to transmit a beacon which is measurable by a candidate relay wireless device. The first wireless device is also configured to receive from the candidate relay wireless device an identity of the candidate relay wireless device and a first quality metric pertaining to a first relay link between the first wireless device and the candidate relay wireless device and to a second relay link between the second wireless device and the candidate relay wireless device.

The first wireless device is further configured to send the received identity and the first quality metric of the candidate relay wireless device to the base station, thereby enabling the base station to select a relay mode for the D2D communication with the candidate relay wireless device acting as the relay, based on the first quality metric.

According to yet another aspect, a method is performed by a candidate relay wireless device for supporting a D2D communication between a first wireless device and a second wireless device over a relay, the first and second wireless devices being served by a base station of a radio network. In this method, the candidate relay wireless device measures beacons transmitted by the first wireless device and by the second wireless device, and detects a possibility to act as said relay between the first and second wireless devices based on the measured beacons.

The candidate relay wireless device then calculates, based on the measured beacons, a quality metric pertaining to a first relay link between the first wireless device and the candidate relay wireless device and to a second relay link between the second wireless device and the candidate relay wireless device. The candidate relay wireless device further transmits an own identity and the calculated quality metric to be received by at least one of the first wireless device and the second wireless device.

According to yet another aspect, a candidate relay wireless device is arranged to support a D2D communication between a first wireless device and a second wireless device over a relay, the first and second wireless devices being served by the base station of the radio network.

The candidate relay wireless device is configured to measure beacons transmitted by the first wireless device and by the second wireless device. The candidate relay wireless device is also configured to detect a possibility to act as said relay between the first and second wireless devices based on the measured beacons.

The candidate relay wireless device is further configured to calculate, based on the measured beacons, a quality metric pertaining to a first relay link between the first wireless device and the candidate relay wireless device and to a second relay link between the second wireless device and the candidate relay wireless device.

The candidate relay wireless device is also configured to transmit an own identity and the calculated quality metric to be received by at least one of the first wireless device and the second wireless device.

Advantages that may result from implementing one or more of the embodiments described herein include that a fitting candidate relay wireless device can be found which in turn enables the base station to effectively compare different available transmission modes and select the relay mode when the relay mode is assessed to provide favourable signal conditions as indicated by the above quality metrics. Thereby, benefits such as improved spectral and energy efficiency, efficient resource utilization, lower transmit power and reduced interference, may be achieved in the radio network.

The above methods, wireless devices and base station may be configured and implemented according to different optional embodiments to accomplish further features and benefits, to be described below.

BRIEF DESCRIPTION OF DRAWINGS

The solution will now be described in more detail by means of exemplary embodiments and with reference to the accompanying drawings, in which.

DETAILED DESCRIPTION

Figure 1:
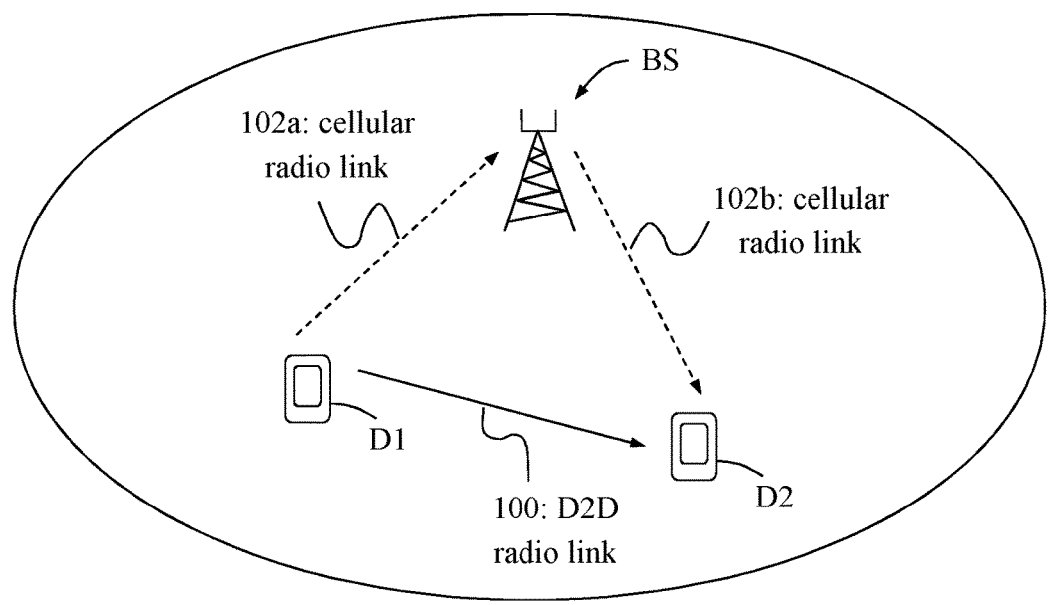
FIG. 1 illustrates a communication scenario with radio links for D2D communication and for cellular communication, according to the prior art.
Figure 2:
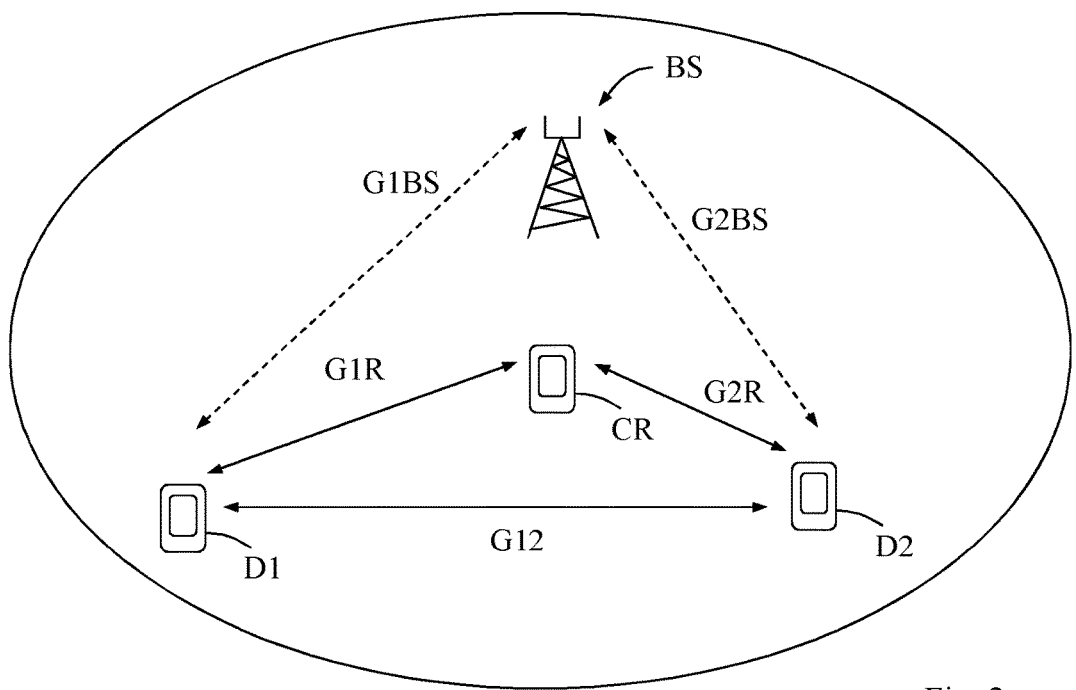
FIG. 2 illustrates quality metrics of radio links involved in a radio communication in either relay mode, direct mode or cellular mode, which can be used in embodiments herein.

In this solution it has been recognized that a favorable communication between two wireless devices may be achieved by employing a D2D communication via an intermediate relay wireless device, which is a transmission mode that will be referred to as a relay mode of communication, when the relay mode is assessed or evaluated to provide better signal quality and/or require less transmission power as compared to the above cellular and direct modes.

In more detail, the relay mode is selected when a combination or sum of a first relay link between the first wireless device and the relay wireless device and a second relay link between the second wireless device and the relay wireless device is estimated to provide better signal quality and/or require less transmission power as compared to using a direct link between the first and second wireless devices or using respective cellular links between the base station and the first and second wireless devices. This solution is directed to procedures for finding a fitting candidate device to act as relay and for comparing the above-described three transmission modes in order to select the relay mode under certain conditions which will be described below.

An example of a procedure with actions, performed by a base station of a radio network, will now be described with reference to the flow chart in FIG. 3. The base station is thus arranged or configured for supporting a D2D communication between a first wireless device and a second wireless device over a relay. This procedure thus illustrates how the base station may operate such that the benefits of improved spectral and energy efficiency, efficient resource utilization, lower transmit power and reduced interference may be achieved, among other things.

A first action 300 illustrates that the base station establishes a connection with the first wireless device and a connection with the second wireless device, which may be done according to regular procedures. These connections are needed to communicate information and messages to and from the respective devices. For example, the first wireless device may have issued a request to start a communication session with the second wireless device. When the base station discovers that it serves both devices, i.e. both devices are located within the coverage area of the base station, the base station is triggered to execute the procedure of evaluating a number of available transmission modes including the above-described cellular, direct and relay modes, and select one of the available transmission modes for the two-way communication as follows.

The following actions assume that the first wireless device has recognized that the relay mode may be possible to employ for the D2D communication and that there is at least one potential relay candidate wireless device present which is able to communicate radio signals directly with both of the first and second wireless devices. A procedure of how this may be conducted will be described in more detail later below.

In a next action 302, the base station receives from the first wireless device an identity of a candidate relay wireless device and a first quality metric denoted "$G_{eq}$" which pertains to a first relay link between the first wireless device and the candidate relay wireless device and to a second relay link between the second wireless device and the candidate relay wireless device. In other words, the first quality metric $G_{eq}$ indicates the quality of the first relay link and the second relay link if they both were to be used in a relay mode for the D2D communication with the candidate relay wireless device acting as the relay. As said above, there may be more than one such candidate relay wireless device and the base station may in that case receive identities and corresponding first quality metrics of multiple candidate relay wireless devices. Although the procedure illustrated in FIG. 3 is described with respect to one such candidate relay wireless device, it does not exclude the possibility of considering multiple candidate relay wireless devices, to be described below.

In this disclosure, the term "quality metric" should be generally understood as any parameter that in some way indicates the quality of a radio link. Some non-limiting examples of quality metric parameters that may be used in this solution include Signal to Interference and Noise Ratio, SINR, signal strength, Bit Error Rate, BER, path loss, and some fading condition parameter. Thus, if the quality metric is SINR or signal strength, a relatively high value indicates good quality, while if the quality metric is BER or path loss, a relatively low value indicates good quality.

In a possible embodiment, the first quality metric $G_{eq}$ may refer to an equivalent channel pertaining to both the first relay link and the second relay link, which equivalent channel has been calculated as:

$$G_{eq} = \frac{G1R * G2R}{G1R + G2R},$$

where G1R indicates quality of the first relay link and G2R indicates quality of the second relay link. For example, G1R may be the signal strength of signals received over the first relay link and G2R may be the signal strength of signals received over the second relay link. In this case, the first quality metric $G_{eq}$ is dependent on adequate quality of both relay links such that this parameter will be much reduced if one of G1R and G2R is significantly smaller than the other.

In a next action 304, the base station obtains a second quality metric denoted "G12" which pertains to a D2D link, i.e. direct link, between the first wireless device and the second wireless device. In another action 306, the base station also obtains a third quality metric denoted "G1BS" which pertains to a cellular link between the base station and the first wireless device. The base station may optionally also obtain a similar quality metric which pertains to a cellular link between the base station and the second wireless device which may be used in the manner described herein. Action 206 assumes that at least the third quality metric G1BS of the cellular link to the first wireless device is obtained as an indication of link quality of the cellular mode.

The second and third quality metrics G12, G1BS may be obtained from measurements made by one or both of the devices and/or by the base station on various signals such as reference signals which are typically transmitted in wireless networks for the purpose of enabling link quality measurements. One or both of the two wireless devices may thus perform D2D link measurements on a beacon signal or the like transmitted from the opposite device. For example, the base station may obtain the second quality metric G12 based on a D2D radio link quality report received from at least one of the first and second wireless devices. In another example, the base station may obtain the third quality metric G1BS based on measurements of the cellular radio link between the base station and the first wireless device. The latter measurements of the cellular radio link may be performed by the base station and/or by the first wireless device.

Another action 308 illustrates that the base station checks whether the first quality metric $G_{eq}$ is greater than both of the second quality metric G12 and the third quality metric G1BS, where the term "max(G12, G1BS)" indicates the greatest value of G12 and G1BS. If so, the base station in this example selects the relay mode in an action 310, for the D2D communication with the candidate relay wireless device acting as the relay. In other words, when the first quality metric $G_{eq}$ indicates a better link quality than both the second quality metric G12 and the third quality metric G1BS, regardless of which type of quality metric parameter is used, the base station selects the relay mode for the D2D communication. The base station then accordingly instructs the first wireless device, the second wireless device and the candidate relay wireless device to communicate according to the relay mode, in an action 312.

On the other hand, if the first quality metric $G_{eq}$ is not greater than both of the second quality metric G12 and the third quality metric G1 BS in action 308, the base station checks whether the second quality metric G12 is greater than the third quality metric G1BS, in another action 314. If so, it can be deduced that the direct mode is more favorable than both the relay mode indicated by G12, and the cellular mode indicated by G1BS. The base station then accordingly selects the direct mode for the D2D communication, in an action 316. If the third quality metric G1BS is found to be greater than the second quality metric G12 in action 314, the base station selects the cellular mode for the D2D communication, in an action 318. Thereby, the base station is able to select the transmission mode that provides the best possible link quality of them all and particularly select the relay mode only when this mode is more favorable than both the cellular and direct modes. After either of actions 316 and 318, the base station may accordingly instruct the first and second wireless device, although not shown here.

It was mentioned above that there may be more than one candidate relay wireless device present which could potentially act as relay in the D2D communication, and two possible alternatives will be described in more detail below, e.g. with reference to FIG. 4. Briefly described, one possible option is that the first wireless device has evaluated the available candidate relay wireless devices and selected basically the best one of them to be presented as a "recommended" candidate relay to the base station, which the base station then considers when selecting the transmission mode as in the example of FIG. 3.

Another possible option is that the first wireless device sends identities and corresponding first quality metrics $G_{eq}$ of the available candidate relay wireless devices to the base station, and in that case it is the base station that evaluates the available candidate relay devices and selects one of them for consideration when selecting the transmission mode. Thus in a possible embodiment, the base station may receive from the first wireless device identities of multiple candidate relay wireless devices and their corresponding first quality metrics $G_{eq}$, and selects one of the candidate relay wireless devices to act as the relay in the D2D communication when the relay mode is selected.

Figure 4:
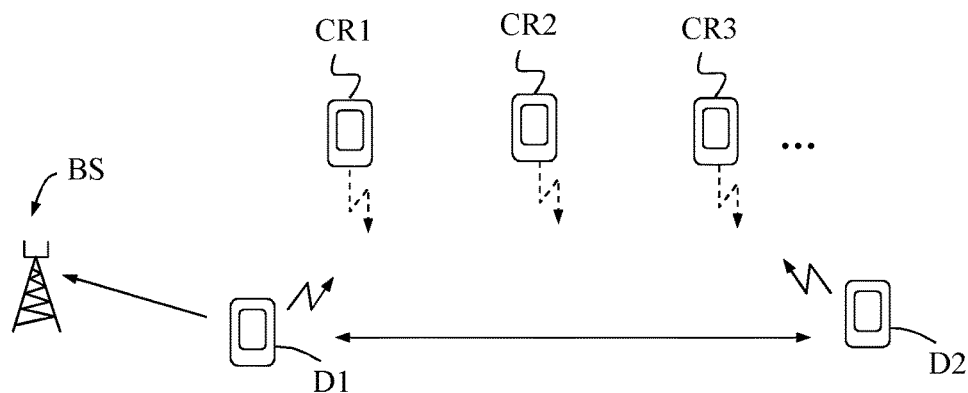
FIG. 4 illustrates a communication scenario where different candidate relay devices are evaluated, according to further possible embodiments.

FIG. 4 illustrates a scenario for supporting a two-way D2D communication between two wireless devices D1, D2 being served by a base station BS. To enable evaluation of whether a relay mode would be favorable and selection of relay device to use in the two-way D2D communication, both devices D1, D2 transmit measurable beacons. In this example, a number of candidate relay wireless devices CR1, CR2, CR3 . . . measure the signal strength of the beacons transmitted by the devices D1, D2 and identify themselves as potential candidates for acting as relay in the two-way D2D communication. In other words, each one of the devices CR1, CR2, CR3 . . . detects a possibility to act as relay, e.g. when the signal strength measured on the beacons from D1 and D2 exceeds some threshold value.

In that case, each candidate relay device CR1, CR2, CR3 . . . determines the above-described "first" quality metric $G_{eq}$ based on the beacons transmitted by devices D1, D2. It has been described above how the first quality metric $G_{eq}$ could be determined from qualities, e.g. received signal strength, of respective relay links between relay and devices D1, D2. In turn, the candidate relay devices CR1, CR2, CR3 . . . start to transmit their respective beacons, indicated by dashed arrows, which contain their identities as well as their determined first quality metric $G_{eq}$. The beacons transmitted by devices CR1, CR2, CR3 . . . are received by the two wireless devices D1, D2.

As indicated by a two-way arrow, the devices D1, D2 may exchange information extracted from their received beacons and at least one of them, D1 for example, may evaluate the candidate relay devices CR1, CR2, CR3 . . . based on the received first quality metric $G_{eq}$ of each candidate relay. As explained above, each first quality metric $G_{eq}$ reflects the quality of a combination of the respective relay links between the communicating devices D1, D2 and each candidate relay device CR1, CR2, CR3 . . . , i.e. the "end-to-end" link quality between D1 and D2 if the candidate relay device would be used in the "two-hop" relay mode. Selection of the best candidate relay wireless device to use, e.g. as a basis for selecting transmission mode, may now be conducted in two alternative ways as follows.

Alternative 1:

The first device D1 sends identities of the multiple candidate relay wireless devices CR1, CR2, CR3 . . . and their corresponding first quality metrics $G_{eq}$ valid for the respective candidate relays, to the base station BS. Thereby, the base station BS can evaluate the candidate relay device CR1, CR2, CR3 . . . and select the "best" one of them at least based on their first quality metrics $G_{eq}$. The base station may then evaluate different transmission modes and possibly select the relay mode with the selected candidate relay device, if that mode is deemed favorable compared to other available transmission modes such as the above-described cellular and direct modes. This mode selection procedure as such has been described above when discussing actions 308-318.

Alternative 2:

At least one of the devices D1, D2 evaluates the candidate relay devices CR1, CR2, CR3 . . . and select the "best" one of them based on their first quality metrics $G_{eq}$. In this operation, the device D1 and/or D2 may select one of the candidate relay devices further based on measurements on signals transmitted from the candidate relay devices in their respective beacons. If both devices D1, D2 select their own preferred or recommended relay device, this information may be exchanged between the two devices D1, D2 to agree on a common candidate. In this scenario, one of the devices, in this case device D1, may be appointed to act as master which decides which candidate relay device to choose and reports it to the base station BS. Device D1 then accordingly sends the identity and the first quality metric $G_{eq}$ of the selected one of the candidate relay devices CR1, CR2, CR3 . . . , to the serving base station BS. The base station is then able to evaluate different transmission modes based on the reported relay device identity and first quality metric $G_{eq}$, and possibly select the relay mode in the manner described herein.

Figure 5:
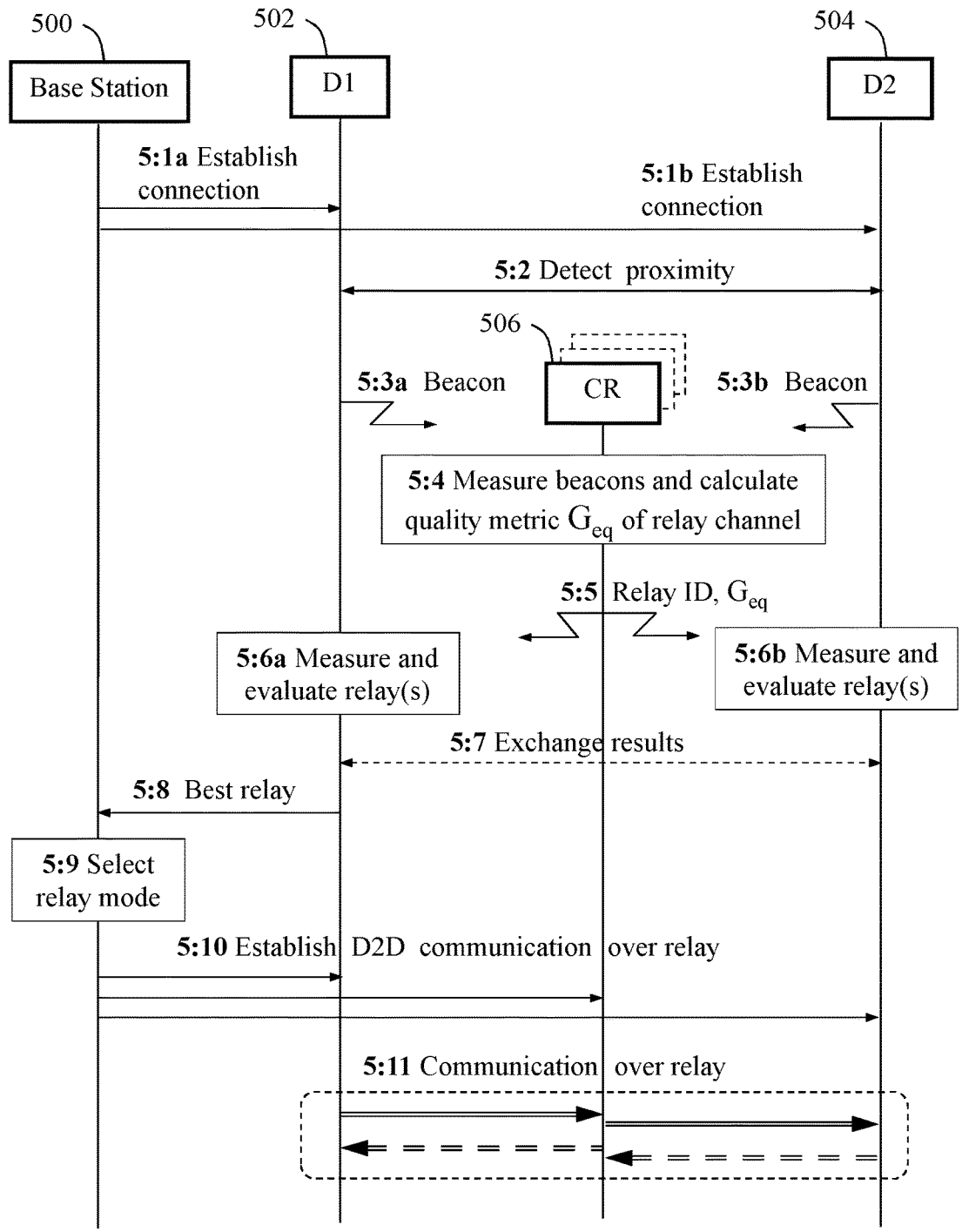
FIG. 5 is a signalling diagram illustrating an example of a procedure to set up a D2D communication in relay mode, according to further possible embodiments.

FIG. 5 illustrates an example of a signalling procedure that may be used for supporting a D2D communication in the relay mode. The procedure involves a base station 500, two wireless devices 502 and 504 denoted D1 and D2 which correspond to the above first and second wireless devices, respectively, and a candidate relay wireless device 506 called candidate relay "CR" for short. As indicated by dashed boxes, there may be more than one candidate relay wireless device to consider, e.g. as described above for FIG. 4. In this example, the first device D1 has requested a two-way communication with the second device D2. Initial actions 5:1a and 5:1b illustrate that connections are established between the base station 500 and the two devices D1 and D2, at least for signaling over respective cellular links. Another action 5:2 illustrates that the devices D1, D2 detect their proximity to one another, e.g. by receiving signals from the opposite device in a conventional peer discovery procedure which is somewhat outside the scope of this solution.

By signaling to the devices D1 and D2, the base station 500 may configure beacons for the devices D1, D2 to transmit, e.g. instructing them to use certain radio resources in time-frequency and to include certain information in the beacons such as their own identities. For example, both devices D1, D2 may be instructed to include both their own identity and the identity of the respective opposite device in their beacons. Thereby, any nearby wireless device receiving the beacons will know that these two devices could potentially be helped by a relay in a D2D communication.

Next, device D1 and device D2 accordingly transmit their beacons as shown by actions 5:3a and 5:3b, which beacons are received and measured by the candidate relay CR. Since each beacon from devices D1, D2 contains the identities of both D1 and D2, the candidate relay CR is able to deduce that these two devices D1, D2 may be helped by a relay device in a D2D communication in the relay mode.

Another action 5:4 thus illustrates that the candidate relay CR measures the signal strength of both beacons and thereby detects a possibility to act as relay provided that the beacons can be received and decoded properly, that is when the signal strength is sufficiently high. In this action, the candidate relay CR also calculates the above-described first quality metric $G_{eq}$ pertaining to the relay links between the candidate relay CR and the first and second devices D1 D2, respectively, based on the measured beacons.

The candidate relay CR now transmits its own beacon, shown by another action 5:5, containing its own identity and the calculated first quality metric $G_{eq}$, which is received by both devices D1 and D2 in this example. The beacon from the candidate relay CR may further contain identities of the device pair D1, D2 to facilitate recognition of the beacon. In the same manner, the devices D1 and D2 may receive a first quality metric $G_{eq}$ from one or more further candidate relays 506, e.g. as described for FIG. 4 above. Further actions 5:6a and 5:6b illustrate that devices D1 and D2 may measure the beacon and evaluate the candidate relay CR, as well as any further candidate relays 506 if present, based on the first quality metric $G_{eq}$, and possibly also based on measurements of the beacon transmitted by the candidate relay CR. The devices D1 and D2 may also exchange the results of the evaluation in an optional action 5:7, e.g. as described for FIG. 4, e.g. to agree on a common recommended candidate relay CR.

The first wireless device D1 now sends the identity and the first quality metric $G_{eq}$ of the candidate relay CR to the base station 500, in an action 5:8. The base station is thereby enabled to select the relay mode for the D2D communication with the candidate relay wireless device CR acting as the relay, based on the first quality metric $G_{eq}$, which is shown in another action 5:9. Once the decision is taken to use the candidate relay CR as relay, a further action 5:10 illustrates that the base station 500 basically establishes the D2D two-way communication over the relay by various suitable signaling with the three involved devices 502, 504 and 506. A final action 5:11 illustrates that the D2D two-way communication over the relay is executed accordingly, e.g. involving data sent from D1 to D2 over CR, shown as full arrows, and data sent from D2 to D1 over CR, shown as dashed arrows.

An example of a procedure with actions, performed by a first wireless device for supporting a D2D communication between the first wireless device and a second wireless device over a relay, will now be described with reference to the flow chart in FIG. 6. As in the previous examples, the first and second wireless devices are both being served by a base station of a radio network. This procedure thus illustrates how the first wireless device may operate in cooperation with the above-described base station such that the benefits of improved spectral and energy efficiency, efficient resource utilization, lower transmit power and reduced interference may be achieved, among other things.

A first action 600 illustrates that the first wireless device transmits a beacon which is measurable by a candidate relay wireless device, i.e. by one or more candidate relay wireless devices. In another action 602, the first wireless device receives from at least one candidate relay wireless device an identity of the candidate relay wireless device and a first quality metric $G_{eq}$ pertaining to a first relay link between the first wireless device and the candidate relay wireless device and to a second relay link between the second wireless device and the candidate relay wireless device.

It was mentioned above that if there are more than one potential relay device, selection of a candidate relay device may be done either by the first device or by the base station according to the two alternatives described for FIG. 4. FIG. 6 illustrates an option where the first wireless device selects a candidate relay device. Thus in a possible embodiment, the first wireless device may receive identities and corresponding first quality metrics $G_{eq}$ from multiple candidate relay wireless devices in action 602. In that case, the first wireless device may select one of the candidate relay wireless devices, as shown by an optional action 604, to act as the relay wireless device in the D2D communication, based on the respective first quality metrics $G_{eq}$, as in Alternative 2 above. In another possible embodiment, the first wireless device may select one of the candidate relay wireless devices further based on measurements on signals transmitted from the multiple candidate relay wireless devices, which was illustrated by dashed arrows in FIG. 4 and actions 5:5, 5:6a in FIG. 5.

In a further action 606, the first wireless device sends the identity and the first quality metric $G_{eq}$ of the candidate relay wireless device, e.g. selected in action 604, to the base station. Thereby, the base station is enabled to select a relay mode for the D2D communication with the candidate relay wireless device acting as the relay, based on the first quality metric $G_{eq}$. When there are more than one candidate relay wireless device present in this procedure, it is also possible that it is the base station that selects one of them to act as the relay wireless device, as in Alternative 1 above. In that case, the first wireless device sends the identity and first quality metric $G_{eq}$ of all candidate relay wireless devices to the base station in action 606.

An example of a procedure with actions, performed by a candidate relay wireless device for supporting a D2D communication between a first wireless device and a second wireless device over a relay, will now be described with reference to the flow chart in FIG. 7. As in the previous examples, the first and second wireless devices are both being served by a base station of a radio network. This procedure thus illustrates how the first wireless device may operate in cooperation with the above-described base station such that the benefits of improved spectral and energy efficiency, efficient resource utilization, lower transmit power and reduced interference may be achieved, among other things.

A first action 700 illustrates that the candidate relay wireless device measures beacons transmitted by the first wireless device and by the second wireless device, e.g. as illustrated by arrows from D1 and D2 in FIG. 4 and actions 5:3a, 5:3b and 5:4 of FIG. 5. In another action 702, the candidate relay wireless device detects a possibility to act as said relay between the first and second wireless devices based on the measured beacons, e.g. if the signal strength of the received beacons exceed some threshold value.

In another action 704, the candidate relay wireless device calculates, based on the measured beacons, a quality metric $G_{eq}$ pertaining to a first relay link between the first wireless device and the candidate relay wireless device and to a second relay link between the second wireless device and the candidate relay wireless device, as in action 5:4 of FIG. 5. In another action 706, the candidate relay wireless device transmits an own identity and the calculated quality metric $G_{eq}$ to be received by at least one of the first wireless device and the second wireless device, which corresponds to action 5:5 of FIG. 5. An optional action 708 indicates that the candidate relay wireless device may receive an instruction from the base station to act as the relay in the D2D communication, which corresponds to action 5:11 of FIG. 5.

Figure 8:
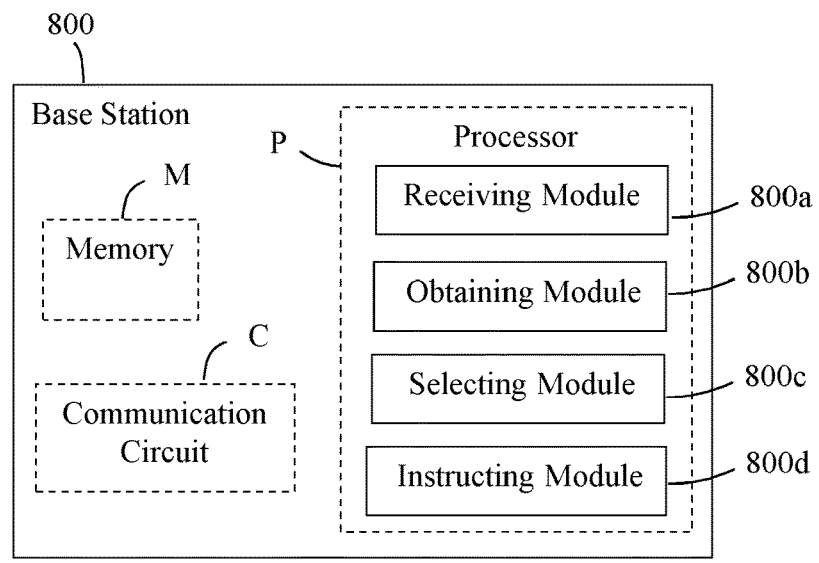
FIG. 8 is a block diagram illustrating a base station, a first wireless device and a candidate relay wireless device in more detail, according to further possible embodiments.
Figure 8:
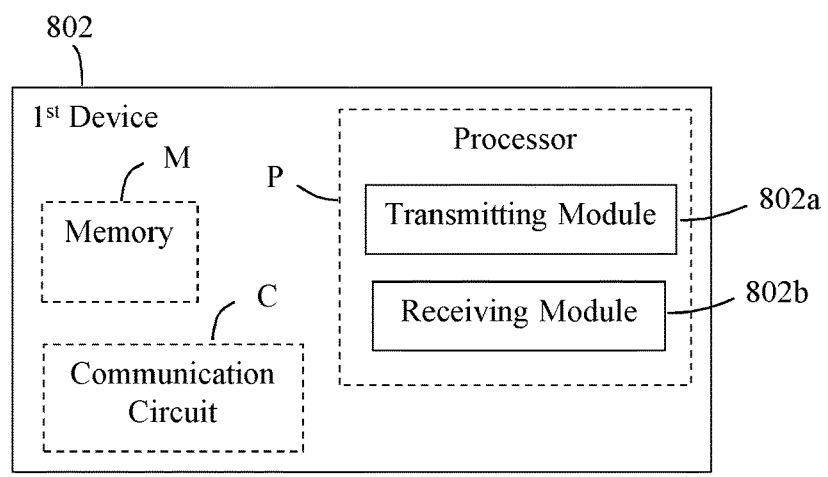
Figure 8:
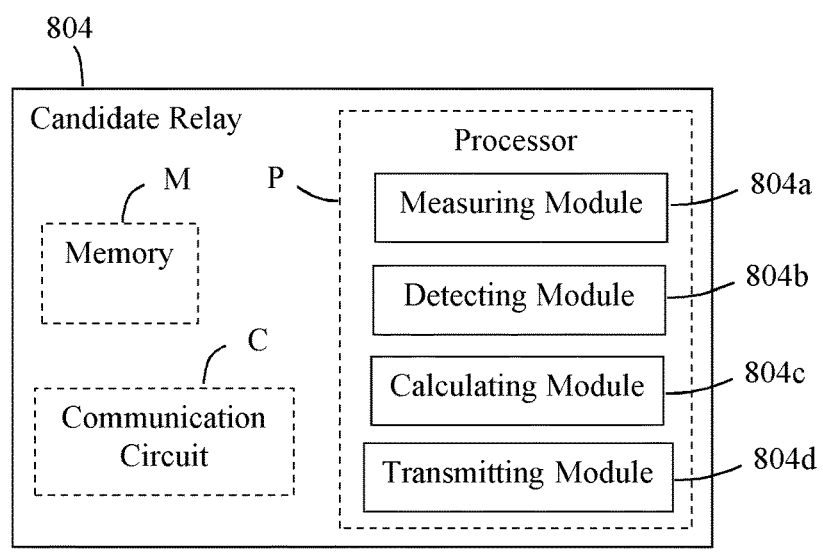

The block diagram in FIG. 8 illustrates a detailed but non-limiting example of how a base station 800, a first wireless device 802 and a candidate relay wireless device 804, respectively, may be structured to bring about the above-described solution and embodiments thereof. In this figure, the base station 800, the first wireless device 802 and the candidate relay wireless device 804 may be configured to operate according to any of the examples and embodiments of employing the solution as described above, where appropriate, and as follows. Each of the base station 800, first wireless device 802 and candidate relay wireless device 804 is shown to comprise a communication circuit "C" with suitable radio equipment for transmitting and receiving radio signals with information in the manner described herein.

Figure 3:
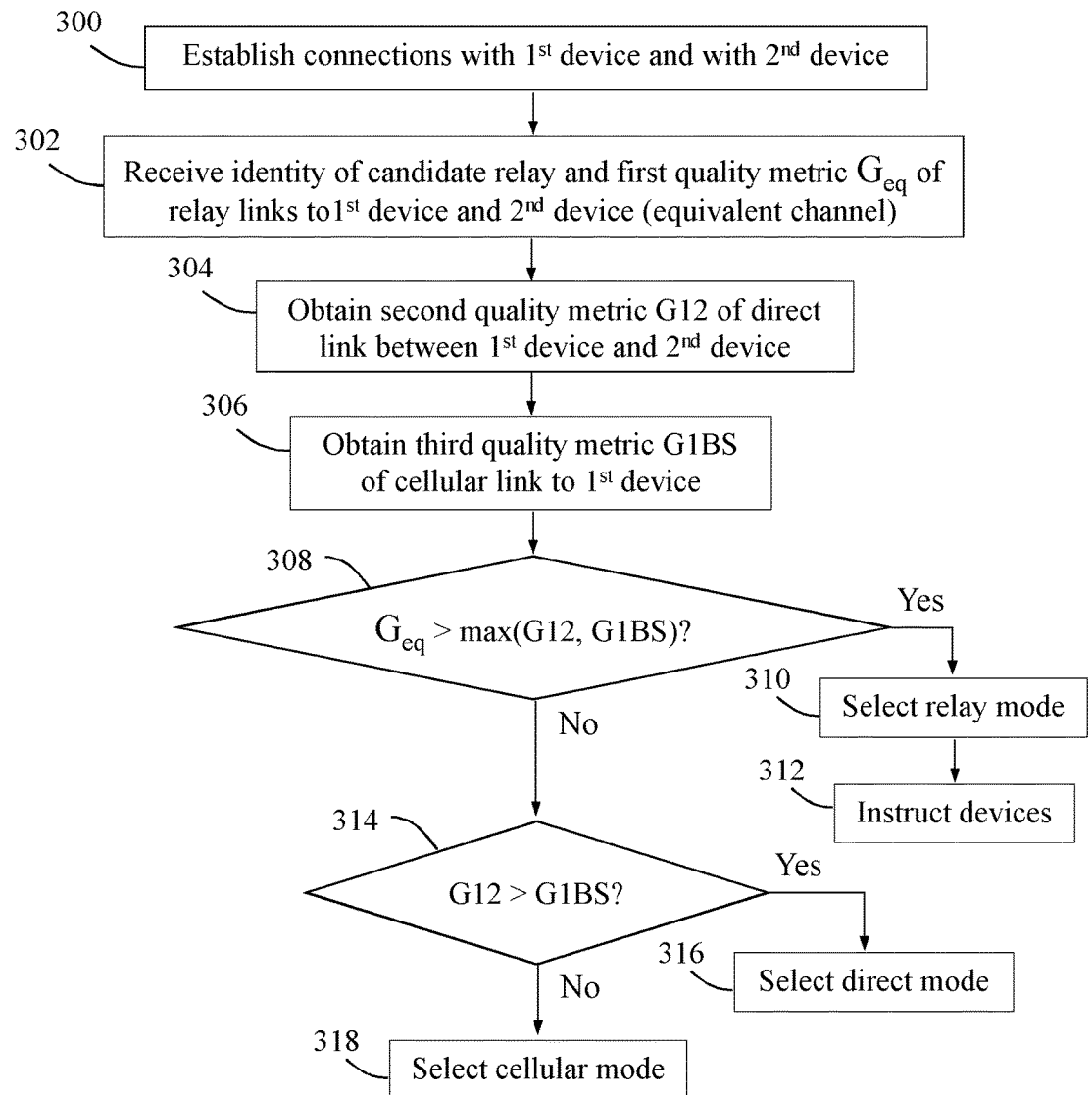
FIG. 3 is a flow chart illustrating a procedure in a base station, according to further possible embodiments.

The base station 800 may be configured or arranged to perform at least the actions 302-312 of the flow chart in FIG. 3 in the manner described above. These actions may be performed by means of different modules in the base station 800 as follows. The base station 800 is operable in a radio network and arranged to support a D2D communication between the first wireless device 802 and a second wireless device, not shown, over a relay.

The base station 800 may comprise a receiving module 800a which is configured to receive from the first wireless device 802 an identity of a candidate relay wireless device, such as device 804 in this example, and a first quality metric, e.g. $G_{eq}$ above, pertaining to a first relay link between the first wireless device 802 and the candidate relay wireless device 804 and to a second relay link between the second wireless device and the candidate relay wireless device 802, e.g. as described above for action 302.

The base station 800 may also comprise an obtaining module 800b which is configured to obtain a second quality metric, e.g. G12 above, pertaining to a D2D link between the first wireless device 802 and the second wireless device, e.g. as described above for action 304. The obtaining module 800b is further configured to obtain a third quality metric, e.g. G1BS above, pertaining to a cellular link between the base station 800 and the first wireless device 802, e.g. as described above for action 306.

The base station 800 may also comprise a selecting module 800c which is configured to, when the first quality metric indicates a better link quality than both the second quality metric and the third quality metric, select a relay mode for the D2D communication with the candidate relay wireless device 804 acting as the relay, e.g. as described above for action 310.

The base station 800 may also comprise an instructing module 800d which is configured to instruct the first wireless device 802, the second wireless device and the candidate relay wireless device 804 to communicate according to the relay mode, e.g. as described above for action 312.

Figure 6:
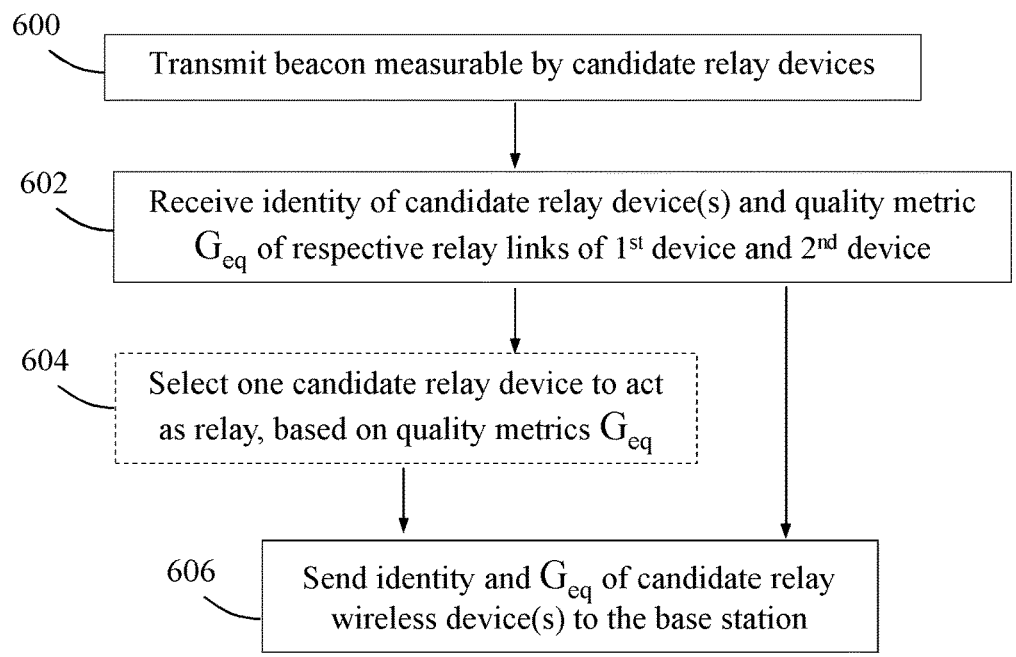
FIG. 6 is a flow chart illustrating a procedure in a first wireless device, according to further possible embodiments.

The first wireless device 802 may be configured or arranged to perform at least the actions 600, 602 and 606 of the flow chart in FIG. 6 in the manner described above. These actions may be performed by means of different modules in the first wireless device 802 as follows. The first wireless device 802 is arranged to support a D2D communication between the first wireless device 802 and a second wireless device over a relay, the first and second wireless devices being served by the base station 800 of the radio network.

The first wireless device 802 may comprise a transmitting module 802a which is configured to transmit a beacon which is measurable by a candidate relay wireless device such as device 804 in this example, e.g. as described above for action 600.

The first wireless device 802 may also comprise a receiving module 802b which is configured to receive from the candidate relay wireless device 804 an identity of the candidate relay wireless device and a first quality metric pertaining to a first relay link between the first wireless device 802 and the candidate relay wireless device 804 and to a second relay link between the second wireless device and the candidate relay wireless device 804, e.g. as described above for action 602.

The transmitting module 802*a* may be further configured to send the received identity and the first quality metric of the candidate relay wireless device 804 to the base station 800, e.g. as described above for action 606, thereby enabling the base station 800 to select a relay mode for the D2D communication with the candidate relay wireless device 804 acting as the relay, based on the first quality metric.

Figure 7:
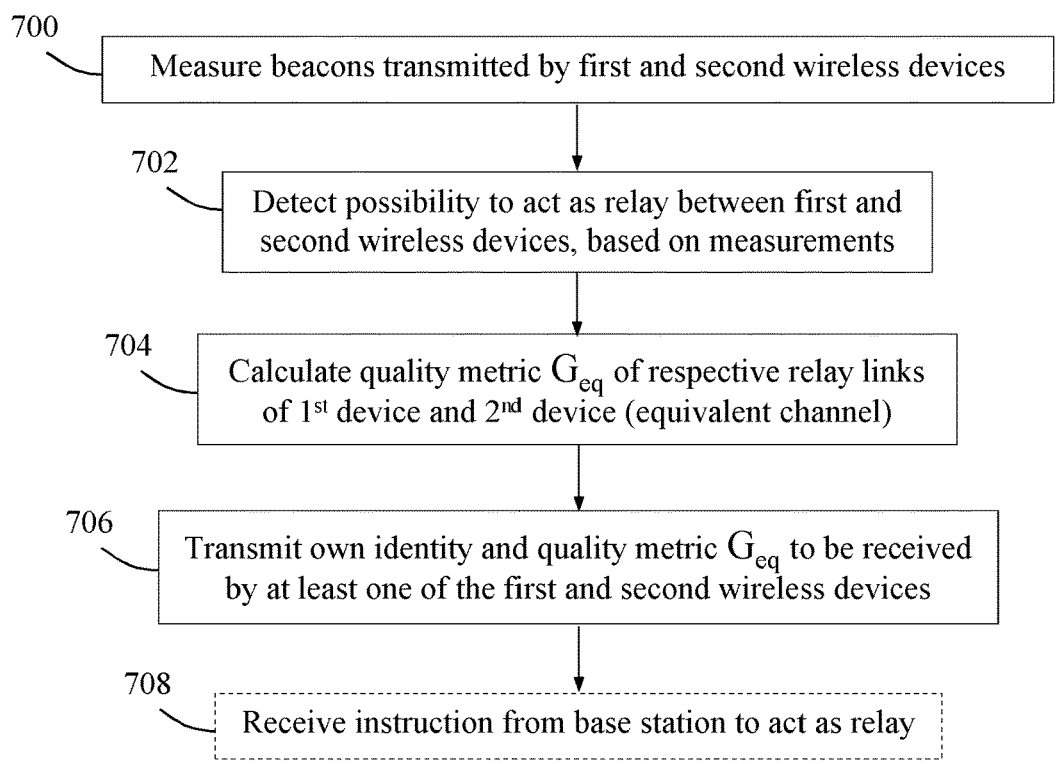
FIG. 7 is a flow chart illustrating a procedure in a candidate relay wireless device, according to further possible embodiments.

The candidate relay wireless device 804 may be configured or arranged to perform at least the actions 700-706 of the flow chart in FIG. 7 in the manner described above. These actions may be performed by means of different modules in the candidate relay wireless device 804 as follows. The candidate relay wireless device 804 is arranged to support a D2D communication between the first wireless device 802 and a second wireless device over a relay, the first and second wireless devices being served by the base station 800 of the radio network.

The candidate relay wireless device 804 may comprise a measuring module 804*a* which is configured to measure beacons transmitted by the first wireless device 802 and by the second wireless device, e.g. as described above for action 700. The candidate relay wireless device 804 may also comprise a detecting module 804*b* which is configured to detect a possibility to act as said relay between the first and second wireless devices based on the measured beacons, e.g. as described above for action 702.

The candidate relay wireless device 804 may also comprise a calculating module 804*c* which is configured to calculate, based on the measured beacons, a quality metric pertaining to a first relay link between the first wireless device 802 and the candidate relay wireless device 804 and to a second relay link between the second wireless device and the candidate relay wireless device 804, e.g. as described above for action 704.

The candidate relay wireless device 804 may also comprise a transmitting module 804*d* which is configured to transmit an own identity and the calculated quality metric to be received by at least one of the first wireless device 802 and the second wireless device, e.g. as described above for action 706.

It should be noted that FIG. 8 illustrates some possible functional modules 800*a-d*, 802*a-b*, 804*a-d* in the base station 800, the first wireless device 802 and the candidate relay wireless device 804, respectively, and the skilled person is able to implement these functional modules in practice using suitable software and hardware. Thus, the solution is generally not limited to the shown structures of the base station 800, the first wireless device 802 and the candidate relay wireless device 804, and the functional modules 800*a-d*, 802*a-b*, 804*a-d* may be configured to operate according to any of the features described in this disclosure, where appropriate.

The embodiments and features described herein may be implemented in computer programs each comprising computer readable code which, when run on a base station 800, the first wireless device 802 and the candidate relay wireless device 804, respectively, causes them to perform the above actions e.g. as described for FIGS. 3, 6 and 7, as well as the appropriate functionality described for the base station 800, the first wireless device 802 and the candidate relay wireless device 804 in FIG. 8. Further, the above-described embodiments may be implemented in respective computer program products each comprising a computer readable medium on which the corresponding computer program is stored. Each computer program product may be a compact disc or other carrier suitable for holding the computer program. Some examples of how the computer program and computer program product can be realized in practice are outlined below.

The functional modules 800*a-d*, 802*a-b*, 804*a-d* described above for FIG. 8 may be implemented in the respective base station 800, first wireless device 802 and candidate relay wireless device 804 by means of program modules of a respective computer program comprising code means which, when run by a processor "P" causes the base station 800, the first wireless device 802 and the candidate relay wireless device 804 to perform the above-described actions and procedures. The processor P may comprise a single Central Processing Unit (CPU), or could comprise two or more processing units. For example, the processor P may include a general purpose microprocessor, an instruction set processor and/or related chips sets and/or a special purpose microprocessor such as an Application Specific Integrated Circuit (ASIC). The processor P may also comprise a storage for caching purposes.

Each computer program may be carried by a computer program product in each of the base station 800, the first wireless device 802 and the candidate relay wireless device 804 in the form of a memory "M" having a computer readable medium and being connected to the processor P. Each computer program product or memory M thus comprises a computer readable medium on which the computer program is stored. For example, the memory M may be a flash memory, a Random-Access Memory (RAM), a Read-Only Memory (ROM) or an Electrically Erasable Programmable ROM (EEPROM), and different program modules could be distributed on different computer program products in the form of memories within the respective base station 800, first wireless device 802 and candidate relay wireless device 804.

The above-described functionality of the base station may be implemented as a computer program comprising computer readable code which, when run on the base station, causes the base station to perform the method according to any of the above embodiments where appropriate. The base station's operation may also be implemented in a computer program product comprising a computer readable medium on which a computer program is stored, wherein the computer program comprises computer readable code which, when run on a base station, causes the base station to perform the method according to any of the above embodiments where appropriate.

Also, the above-described functionality of the first wireless device may be implemented as a computer program comprising computer readable code which, when run on the first wireless device, causes the first wireless device to perform the method according to any of the above embodiments where appropriate. The first wireless device's operation may also be implemented in a computer program product comprising a computer readable medium on which a computer program is stored, wherein the computer program comprises computer readable code which, when run on a first wireless device, causes the first wireless device to perform the method according to any of the above embodiments where appropriate.

Also, the above-described functionality of the candidate relay wireless device may be implemented as a computer program comprising computer readable code which, when run on the candidate relay wireless device, causes the candidate relay wireless device to perform the method according to any of the above embodiments where appropriate. The candidate relay wireless device's operation may also be implemented in a computer program product comprising a computer readable medium on which a computer program is stored, wherein the computer program comprises computer readable code which, when run on a candidate relay wireless device, causes the candidate relay wireless device to perform the method according to any of the above embodiments where appropriate.

While the solution has been described with reference to specific exemplary embodiments, the description is generally intended to illustrate the inventive concept and should not be taken as limiting the scope of the solution. For example, the terms "base station", "wireless device", "quality metric", "relay device", "beacon", "relay mode", direct mode" and "cellular mode" have been used throughout this description, although any other corresponding entities, functions, and/or parameters could also be used having the features and characteristics described here. The solution is defined by the appended claims.

The invention claimed is:

1. A method, performed by a base station of a radio network, for supporting a Device-to-Device (D2D) communication between a first wireless device and a second wireless device over a relay, the method comprising:
receiving, from the first wireless device, an identity of a candidate relay wireless device and a first quality metric pertaining to a first relay link between the first wireless device and the candidate relay wireless device and to a second relay link between the second wireless device and the candidate relay wireless device, wherein the first quality metric refers to an equivalent channel pertaining to both the first relay link and the second relay link, which equivalent channel has been calculated as:

$$G_{eq} = \frac{G1R * G2R}{G1R + G2R},$$

where G1R indicates quality of the first relay link and G2R indicated quality of the second relay link;
obtaining a second quality metric pertaining to a D2D link between the first wireless device and the second wireless device;
obtaining a third quality metric pertaining to a cellular link between the base station and the first wireless device; and
when the first quality metric indicates a better link quality than both the second quality metric and the third quality metric,
selecting a relay mode for the D2D communication with the candidate relay wireless device acting as the relay and
instructing the first wireless device, the second wireless device and the candidate relay wireless device to communicate according to the relay mode.

2. The method according to claim 1, wherein the method comprises:
receiving, from the first wireless device, identities of multiple candidate relay wireless devices and their corresponding first quality metrics; and
selecting one of the candidate relay wireless devices to act as the relay in the D2D communication.

3. A base station operable in a radio network, the base station being arranged to support a Device-to-Device (D2D) communication between a first wireless device and a second wireless device over a relay, wherein the base station comprises:
a communication circuit configured to communicate with wireless devices; and
processing circuitry operatively associated with the communication circuit and configured to:
receive, from the first wireless device, an identity of a candidate relay wireless device and a first quality metric pertaining to a first relay link between the first wireless device and the candidate relay wireless device and to a second relay link between the second wireless device and the candidate relay wireless device, wherein the first quality metric refers to an equivalent channel pertaining to both the first relay link and the second relay link, which equivalent channel has been calculated as:

$$G_{eq} = \frac{G1R * G2R}{G1R + G2R},$$

where G1R indicates quality of the first relay link and G2R indicates quality of the second relay link;
obtain a second quality metric pertaining to a D2D link between the first wireless device and the second wireless device;
obtain a third quality metric pertaining to a cellular link between the base station and the first wireless device; and
when the first quality metric indicates a better link quality than both the second quality metric and the third quality metric,
select a relay mode for the D2D communication with the candidate relay wireless device acting as the relay and
instruct the first wireless device, the second wireless device and the candidate relay wireless device to communicate according to the relay mode.

4. The base station according to claim 3, wherein the processing circuitry is configured to receive from the first wireless device identities of multiple candidate relay wireless devices and their corresponding first quality metrics, and select one of the candidate relay wireless devices to act as the relay in the D2D communication.

* * * * *